United States Patent
Letovsky

(10) Patent No.: US 6,786,045 B2
(45) Date of Patent: Sep. 7, 2004

(54) THERMAL RECIPROCATING ENGINE

(76) Inventor: Howard Letovsky, P.O. Box 1925, Willits, CA (US) 95490

( * ) Notice: Subject to any disclaimer, the term of this patent is extended or adjusted under 35 U.S.C. 154(b) by 0 days.

(21) Appl. No.: 10/646,290

(22) Filed: Aug. 22, 2003

(65) Prior Publication Data

US 2004/0035107 A1 Feb. 26, 2004

Related U.S. Application Data

(62) Division of application No. 10/165,722, filed on Jun. 10, 2002, now Pat. No. 6,647,725.

(51) Int. Cl.$^7$ .............................. F03G 7/02; F03G 7/06
(52) U.S. Cl. .................................. 60/641.8; 60/641.15
(58) Field of Search .......................... 60/641.8, 641.11, 60/641.12, 641.15

(56) References Cited

U.S. PATENT DOCUMENTS

| | | | | |
|---|---|---|---|---|
| 3,989,417 A | * | 11/1976 | Neidigh | 417/379 |
| 4,006,594 A | * | 2/1977 | Horton | 60/641.13 |
| 4,075,847 A | * | 2/1978 | Ray | 60/527 |
| 4,307,571 A | * | 12/1981 | Jackson | 60/641.5 |
| 4,598,550 A | * | 7/1986 | Abbott | 60/641.8 |
| 6,647,725 B1 | * | 11/2003 | Letovsky | 60/641.6 |

* cited by examiner

Primary Examiner—Hoang Nguyen

(57) ABSTRACT

The present invention provides novel engine technologies for power generation and work applications. The engines transform sunlight, heat, or cold, directly into mechanical force. The invention uses a focusing means to apply temperature differentials to a thermally reactive material retained in moveable housings. Said thermally reactive material is mounted in contact with a bearing element configured to apply directional force to said thermally reactive material surface as it changes shape in response to said applied temperature differentials.

2 Claims, 4 Drawing Sheets

THERMAL RECIPROCATING ENGINE

This patent application is a divisional application of patent application Ser. No. 10/165,722, filed on Jun. 10, 2002, now U.S. Pat. No. 6,647,725 confirmation number 2936, Art Unit 3748, examiner Sheldon J. Richter.

BACKGROUND

1. Field of Invention

The present invention relates generally to motors and engines.

2. Description of Prior Art

Generators, Motors and engines are well known in prior art. Electric motors, as well as gasoline and diesel engines, are the mainstay of power generation, transportation, and power tools. They range in efficiency from a high of 95% in electric motors to a low of 33% in gasoline engines. However, electric motors require electricity to operate, and electricity costs are steadily rising. Internal combustion engines require hydrocarbon fuels to operate, and they are steadily rising in cost as well. Electric generators are highly efficient as well, but they also require costly fuel sources or hydroelectric energy to create electricity. The Stirling engine is a prior art example of an external combustion thermal differential motor—but it provides relatively low power and is impractical for most modem applications.

A number of "memory metal" actuator and motor designs using bi-metal or Nitinol materials have been disclosed in prior art. Gummin's U.S. Pat. No. 6,326,707 describes a shape memory alloy actuator using a plurality of wires. Similarly, Richardson's U.S. Pat. No. 3,940,935 uses a nitinol strand as a spring tensioner. Kutlucinar's U.S. Pat. No. 6,226,992 discloses a heat converter engine based on shape memory materials that also use a plurality of strands.

The present invention describes unique shape memory material power generating engine technologies which have a minimum of moving parts, require only one shape memory element, an can be scaled to produce tremendous torque with available ambient environmental temperature differentials as fuel—specifically heat, cold, water, and/or sunlight.

SUMMARY OF THE INVENTION

The primary objective of the present invention is to provide an efficient, high torque motor which uses sunlight or ambient cold or heat differentials as fuel sources. The invention may also use artificially generated thermal differentials to improve or increase its power output.

The engines in accordance with the present invention transform sunlight, heat, or cold, directly into rotary and linear mechanical force. The invention uses a focusing means to apply ambient temperature differentials to a thermally reactive material retained in a moveable housing. Said thermally reactive material is mounted in contact with a bearing element which either receives or applies directional force from or to said thermally reactive material surface as said surface changes shape in response to said applied ambient temperature differentials.

The invention as described herein has many advantages over prior art solutions. A more complete understanding of the present invention, as well as further features and advantages, will be obtained by reference to the following detailed description, drawings, and claims.

DETAILED DESCRIPTION OF THE INVENTION

Figure 1:
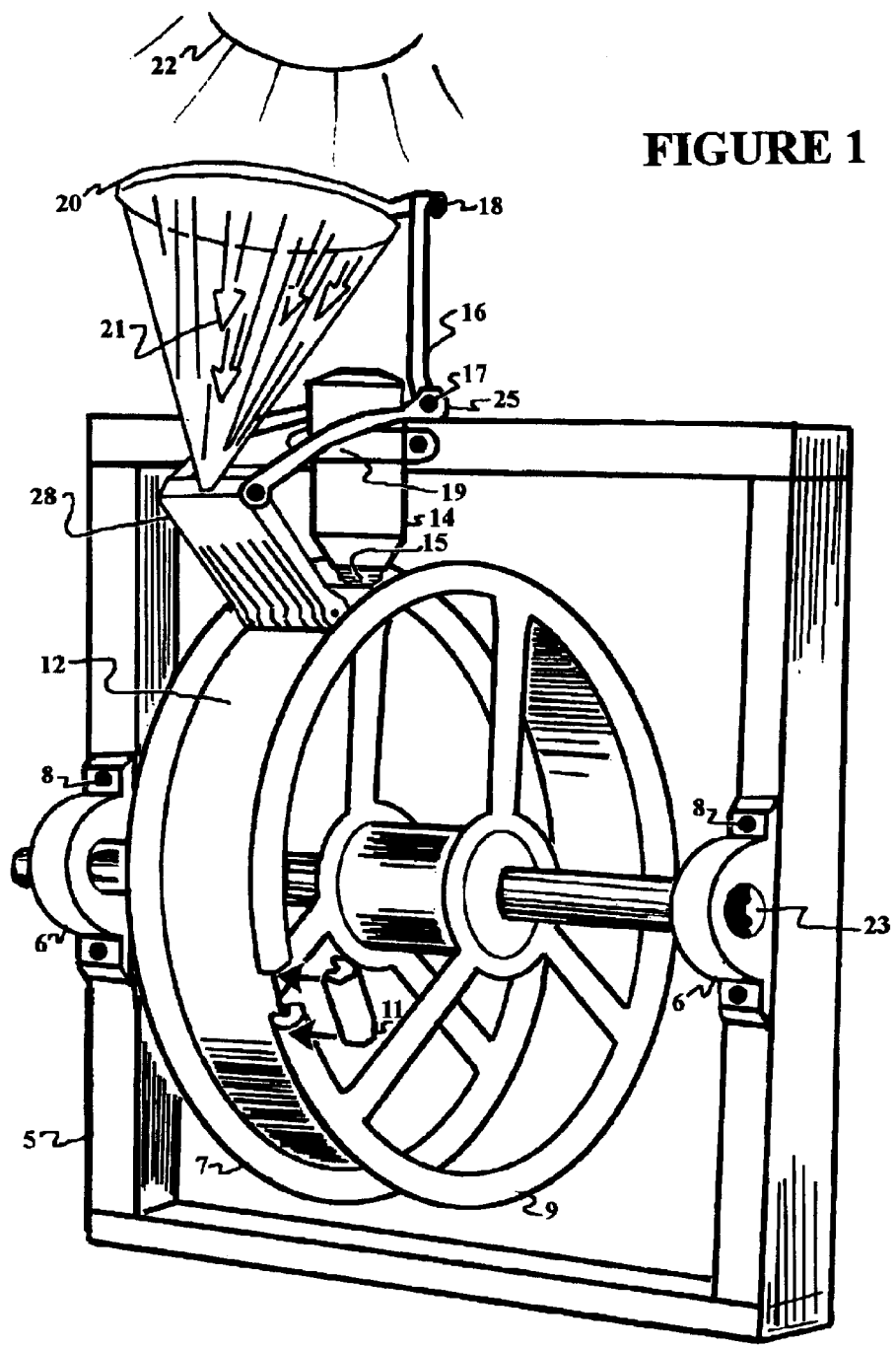
FIG. 1 is an isometric detail of a rotary sunlight engine in accordance with the present invention.

The preferred embodiment of the present invention as presented in FIG. 1 provides a bearing mount means 5 configured to retain bearing assemblies 6. Left rotatable retaining collar 7 is rigidly mounted to axle 23. Right rotatable retaining collar 9 is also rigidly mounted to axle 23. The inner rims of the perimeter of collars 7 and 9 are fabricated with indentations in a manner to allow the rigid retention of thermally reactive perimeter wheel strip 12 as it is clamped between collars 7 and 9. Detail 11 shows an exemplary removed segment of collar 9 to further illustrate the thermally reactive perimeter wheel strip 12 retention indentation.

Thermally reactive perimeter wheel strip 12 may be fabricated from bimetal strip material as used in thermometers, or it may be fabricated from other types of memory metal such as nitinol. The important capability of thermally reactive perimeter wheel strip 12 is that it expand and/or contract rapidly when exposed to a heat or cold source, and return to its original shape equally as rapidly when said source is removed.

A thermal differential element is provided in this embodiment which may be a sunlight focusing means 20, and which may be a magnifying lens mounted on positioning arms 16 with bolts 18 such that said focusing means 20 is aimed to apply magnified solar rays 21 collected from the sun 22 to temperature differential focusing means 28. Positioning arms 16 are fixedly mounted to bearing mount means 5.Temperature differential focusing means 28 is fixedly mounted to pivot arms 25, which are in turn pivotably mounted to positioning arms 16 by pins 17. Temperature differential focusing means 28 is in thermally conductive contact with thermally reactive perimeter wheel strip 12 so as to generate heat on the surface of thermally reactive perimeter wheel strip 12.

Ball transfer bearing housing 14 may be fixedly mounted adjacent to focusing means 20 on bearing mount means 5 with clamp 19. Ball transfer bearings are well known in prior art so it is not necessary to go into further detail on their construction herein. The important capability of the ball transfer bearing housing 14 is that it is fixedly mounted so that the freely rolling ball bearing 15 applies positive contact pressure to said thermally reactive perimeter wheel strip 12 adjacent to said temperature differential focusing means 28 such that a change in shape of the thermally reactive perimeter wheel strip 12 increases the normal pressure on said freely rolling ball bearing 15 causing said thermally reactive perimeter wheel strip 12 to push away from said freely rolling ball bearing 15, in turn causing said axle 23, which is fixedly mounted to collars 7 and 9, to rotate within bearing assemblies 6. As each new portion of thermally reactive perimeter wheel strip 12 is exposed to, and heated in turn by sunlight focusing means 20, pressure is continuously applied to said freely rolling ball bearing 15 to maintain rotation of collars 7 and 9. Due to the pivot point at pin 17, temperature differential focusing means 28 is free to ride up and down on wheel strip 12 as its shape changes so as to maintain thermal contact.

A perimeter gear or other power take-off element may be fixedly attached to the outer rim of collars 7 and/or 9 to allow the usage of the available horsepower and torque provided by the invention described herein. Usage of the available horsepower and torque provided by the invention described herein may also be provided by an attachment to axle 23.

Figure 2:
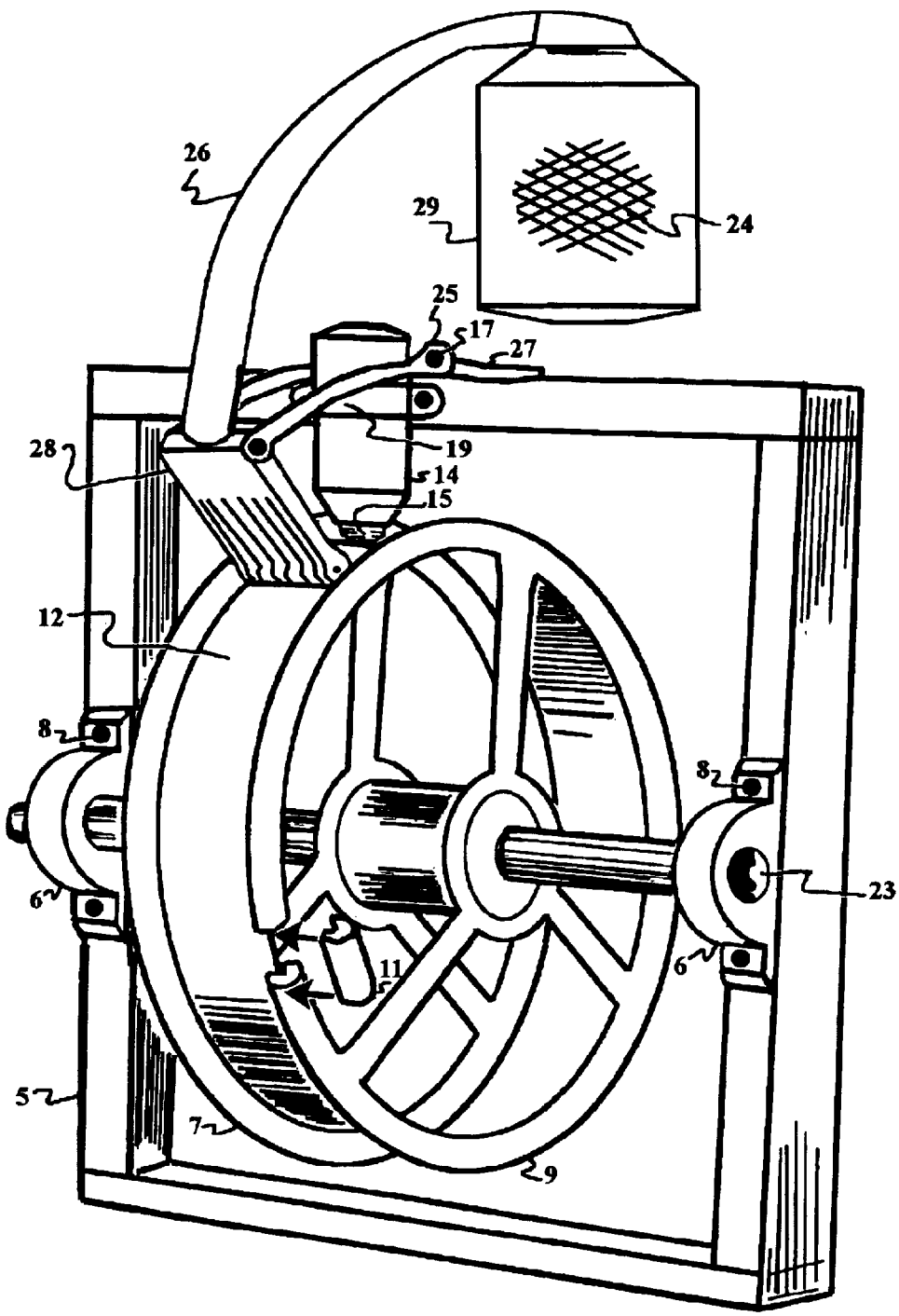
FIG. 2 is an isometric detail of a rotary thermal differential engine in accordance with the present invention.

Another embodiment of the present invention as presented in FIG. 2 is almost identical to the embodiment referenced in FIG. 1, so element identification numerals are retained for identical components. However, different numbers are assigned to different components.

In the embodiment of the invention presented in FIG. 2, the sunlight focusing means 20 is replaced with a temperature differential conducting means 26 in thermal contact with, and fixedly mounted to temperature differential focusing means 28. Positioning arms 16 are replaced with mounting arms 27 fixedly attached to bearing mount means 5. Temperature differential focusing means 28 is in turn, in thermally conductive contact with thermally reactive perimeter wheel strip 12. Temperature differential focusing means 28 may be a heat sink, and may be configured to absorb cold or hot temperatures from the ambient air, or from temperature differential conducting means 26—which may be flexible tubes or any other thermal media conductor—and which, may be fed from a thermal medium 24 stored in hot or cold media reservoir 29. Thermal medium 24 may be a water source, a waste heat source, or any other means to store temperature variations from ambient.

As the temperature differential focusing means 28 develops a temperature variation relative to ambient, said temperature variation is applied to the surface of thermally reactive perimeter wheel strip 12 through temperature differential focusing means 28, wheel strip 12 puts pressure on ball 15, and the apparatus rotates exactly as in the embodiment in FIG. 1. In other embodiments of the invention shown in FIG. 2, the temperature differential focusing means 28 may be a laser beam, a gas flame, an ice cube, or any other medium that may affect a change in the surface temperature of thermally reactive perimeter wheel strip 12.

Figure 3:
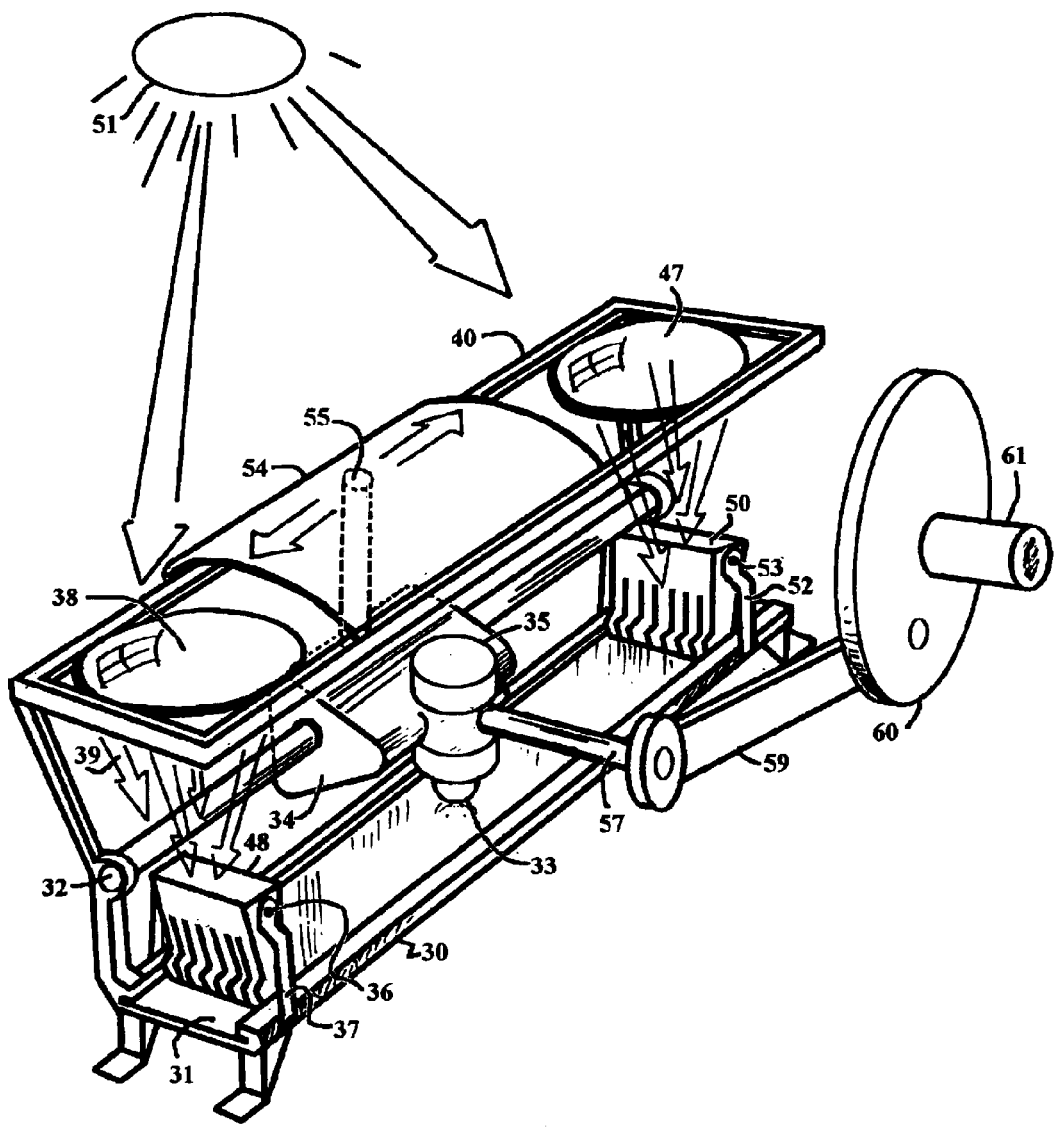
FIG. 3 is an isometric detail of a reciprocating sunlight engine in accordance with the present invention.

Another embodiment of the present invention as presented in FIG. 3 provides a thermal differential reciprocating engine apparatus which includes a horizontal component retaining means 30 configured to fixedly retain a thermally reactive material strip 31.

Horizontal component retaining means 30 is also configured to fixedly retain a linear bearing assembly travel rod means 32 substantially parallel to said thermally reactive material such that bearing housing 35 may freely slide horizontally along travel rod means 32 in a manner also substantially parallel to said thermally reactive material strip 31. Ball transfer bearing assembly 35 is fixedly attached to bearing housing 34 such that ball bearing 33 maintains contact with said thermally reactive material strip 31.

A first sunlight focusing means 38 is mounted on the left side of upper element retaining means 40, and configured to direct magnified sunlight 39, collected from the sun 51, to temperature differential focusing means 48. Temperature differential focusing means 48 is moveably mounted to a slotted relief in retaining arms 37 with pins 36. Retaining arms 37 are in turn fixedly mounted to horizontal component retaining means 30. Temperature differential focusing means 48 is in thermally conductive contact with thermally reactive material strip 31 so as to generate heat or cold on the surface of said thermally reactive material strip 31. Due to the slot relief in retaining arms 25, temperature differential focusing means 48 is free to ride up and down on material strip 31 as its shape changes.

A second sunlight focusing means 47 is mounted on the right side of upper element retaining means 40, and configured to apply magnified sunlight to temperature differential focusing means 50. Temperature differential focusing means 50 is moveably mounted to a slotted relief in retaining arms 52 with pins 53. Retaining arms 52 are in turn fixedly mounted to horizontal component retaining means 30. Temperature differential focusing means 50 is in thermally conductive contact with thermally reactive material strip 31 so as to generate heat on the surface of said thermally reactive material strip 31. Due to the slot relief in retaining arms 52, temperature differential focusing means 50 is free to ride up and down on material strip 31 as its shape changes.

As the surface of thermally reactive material strip 31 expands in response to the applied magnified sunlight heat temperature differential provided by first temperature differential focusing means 48, bearing 33 is forced in a direction opposite to the change in surface height which leads to the second temperature differential focusing means 50. As bearing 33 approaches said second temperature differential focusing means 50, second temperature differential focusing means 50 applies a thermal differential to the surface of thermally reactive material strip 31, forcing said bearing 33 back towards first temperature differential focusing means 48.

The cycle repeats indefinitely as sunlight is alternately restricted from, and released into, first and second temperature differential focusing means 48 and 50 through sunlight flow directing valve 54. Said valve 54 is a light blocking means which is slidably mounted in thermal differential element retaining means 40, and fixedly coupled to linear bearing housing 34 by vertical shaft 55. Valve 54 alternately blocks and allows passage of the sun's rays through sunlight focusing means 38 and 47 onto the temperature differential focusing means 48 and 50 as linear bearing housing 34 travels from side to side. Power transfer shaft 57 may be fixedly attached to ball transfer bearing means 35 at right angles to travel rod means 32 to allow the usage of the available horsepower and torque provided by the invention as bearing housing 34 accelerates from side to side in opposition to the application of said directional forces. Shaft 57 may also be fixedly attached to connecting arm 59, which may in turn be connected to crank 60 fixedly mounted to crankshaft 61. Power from the apparatus may be extracted from shaft 57, crankshaft 61, or any other suitable motive energy attachment point on the apparatus.

The embodiment of the present invention as described in FIG. 3 is a novel reciprocating engine that operates on an applied thermal differential provided by focused sunlight. The relative difference between ambient temperature and the temperature applied to the thermally reactive material strip 31 determines the net available horsepower. Sunlight may replaced by any ambient temperature differential source.

Figure 4:
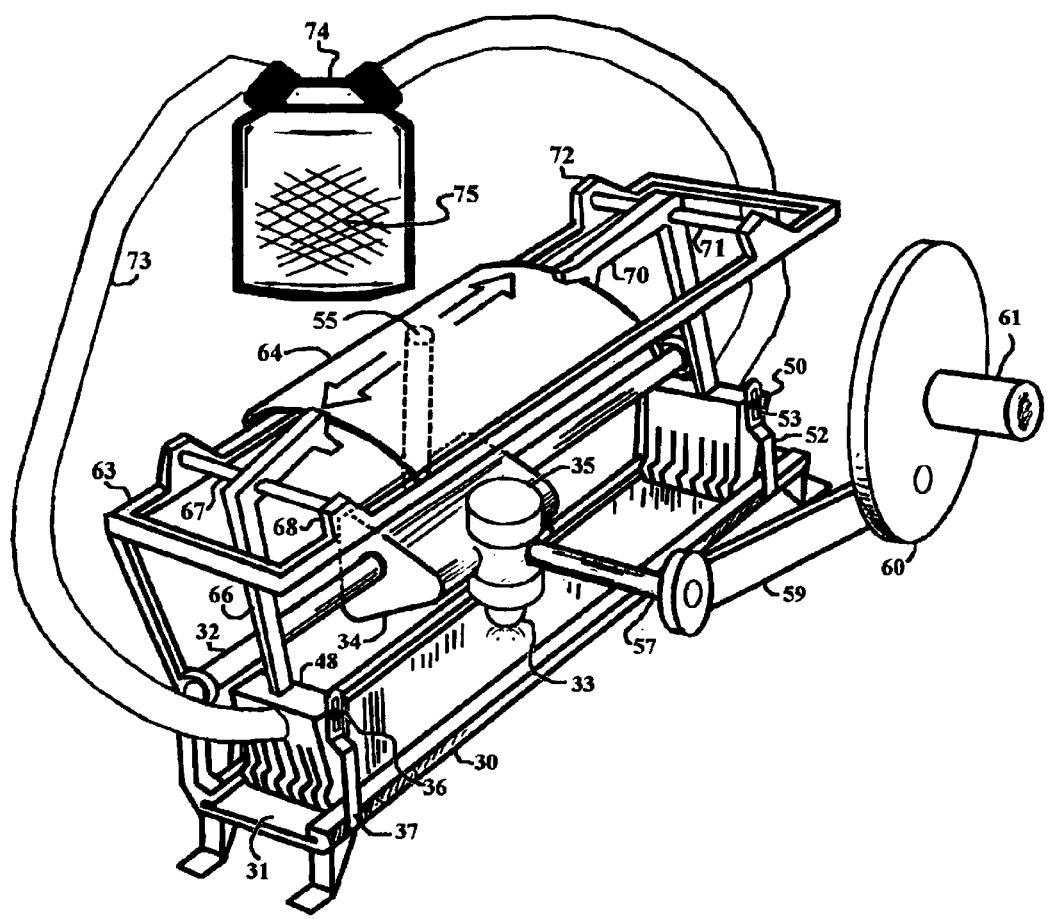
FIG. 4 is an isometric detail of a reciprocating thermal differential engine in accordance with the present invention.

Another embodiment of the present invention as presented in FIG. 4 is almost identical to the embodiment referenced in FIG. 3, so element identification numerals are retained for identical components; however, different numbers are assigned to different components.

In the embodiment of the invention presented in FIG. 4, the sunlight focusing means 38 and 47 are eliminated. Upper element retaining means 40 is replaced with upper rocker element retaining means 63. Sunlight flow directing valve 54 is replaced with rocker actuator 64. Left rocker arm 66 is moveably attached to left rocker pivot rod 67, retained in pivot mounts 68, such that pressure exerted on said arm 66 will press on first temperature differential focusing means 48 to maintain thermal contact with strip 31. Right rocker arm 70 is moveably attached to right rocker pivot rod 71, retained in pivot mounts 72, such that pressure exerted on said arm 70 by actuator 64 will be transferred to second temperature differential focusing means 50 to maintain thermal contact with strip 31.

Rocker actuator 64 is slidably mounted in upper rocker element retaining means 63, and fixedly coupled to linear bearing housing 34 by vertical shaft 55. Rocker actuator 64 alternately applies pressure to the temperature differential focusing means 48 and 50 as linear bearing housing 34 travels from side to side. Power transfer shaft 57 may be fixedly attached to ball transfer bearing means 35 at right angles to travel rod means 32 to allow the usage of the available horsepower and torque provided by the invention as bearing housing 34 accelerates from side to side in opposition to the application of said directional forces. Shaft 57 may also be fixedly attached to connecting arm 59, which may in turn be connected to crank 60 fixedly mounted to crankshaft 61. Power from the apparatus may be extracted from shaft 57, crankshaft 61, or any other suitable motive energy attachment point on the apparatus.

Temperature differential media conducting means 73—which may be flexible tubes or any other thermal media conductor—and which, may be fed from a hot or cold media reservoir 74, are thermally coupled to, which directs the flow of thermal medium 75 into and out of temperature differential focusing means 48 and 50. Thermal medium 75 may be a water source, a waste heat source, or any other means to store temperature variations that differ from ambient.

The cycle repeats indefinitely as rocker arms 68 and 69 alternately force temperature differential focusing means 48 and 50 into direct contact with strip 31 in response to the pressure exerted on said rocker arms 68 and 69 by rocker actuator 64.

The embodiment of the present invention as described in FIG. 4 is a novel version of a reciprocating engine which operates on any applied thermal differential. The relative difference between ambient temperature and the temperature applied to the thermally reactive material strip 31, the size of thermally reactive strip 31, and the tensile strength of strip 31, are key factors that determine the net available horsepower.

It is to be understood that the embodiments and variations shown and described herein are merely illustrative of the principles of this invention and that various modifications may be implemented by those skilled in the art without departing from the scope and spirit of the invention.

I claim:

1. A Thermal Differential Reciprocaling Engine apparatus comprising in combination:

at least one horizontal material retaining means;

at least one thermally reactive material fixedly mounted within said horizontal material retaining means;

two temperature differential focusing means configured to apply temperature differentials to said thermally reactive material, and a linear bearing travel rod mounted substantially parallel with said horizonal retaining means;

at least one bearing means slidably mounted to said horizontal material retaining means by sliding on said linear bearing travel rod, such that said bearing means may be in contact with and react to, the changes in shape of the surface of said thermally reactive material that occur in response to temperature difrerentials applied by said temperature differential focusing means.

2. A Thermal Differential Reciprocating Engine apparatus according to claim 1 that provides at least one means to apply a restrictive sliding force to said bearing means.

* * * * *